May 8, 1923.
W. C. SMITH
SELF ALIGNING PULLEY
Filed March 1, 1921
1,454,657
4 Sheets-Sheet 1
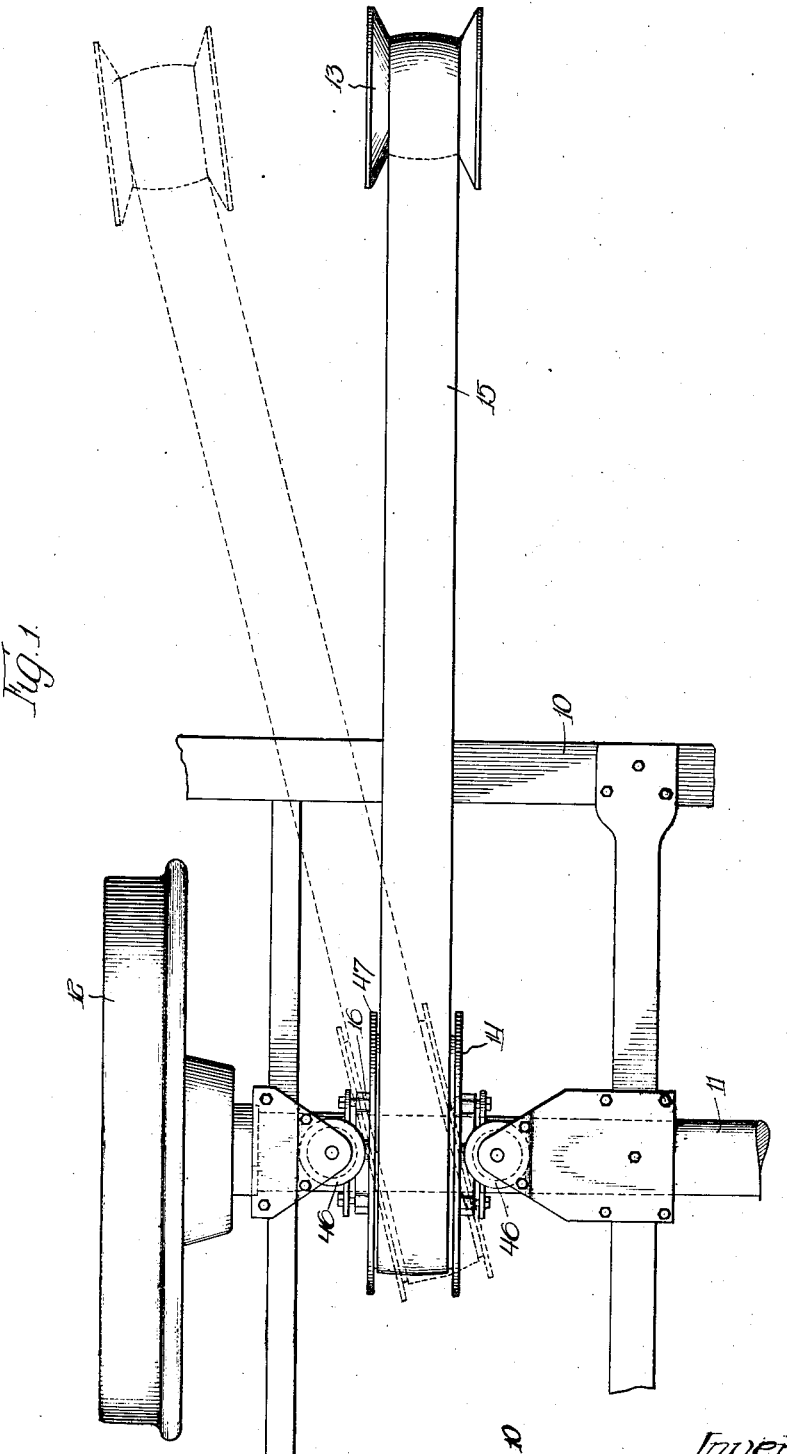

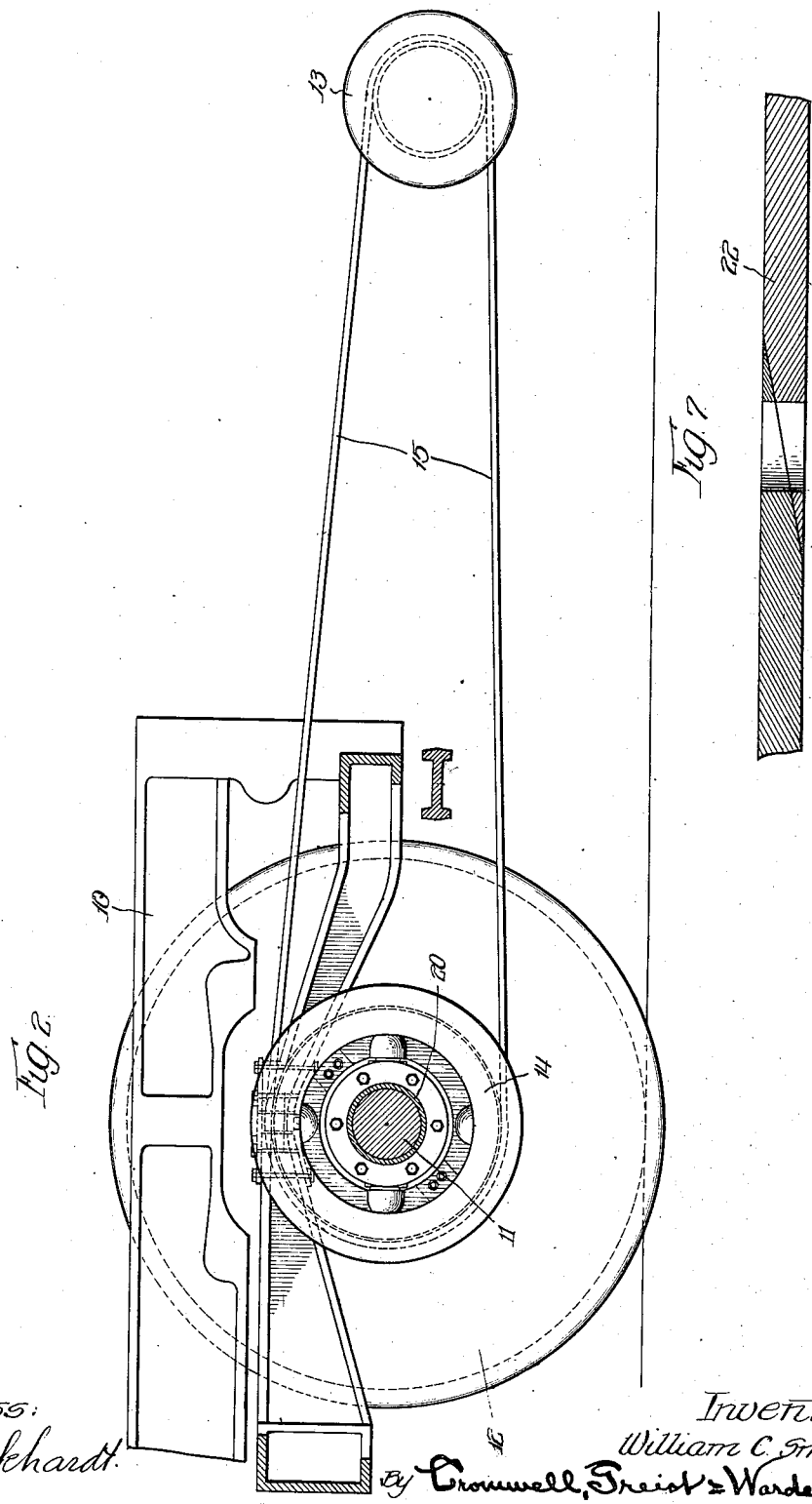

May 8, 1923.
W. C. SMITH
1,454,657
SELF ALIGNING PULLEY
Filed March 1, 1921
4 Sheets-Sheet 3
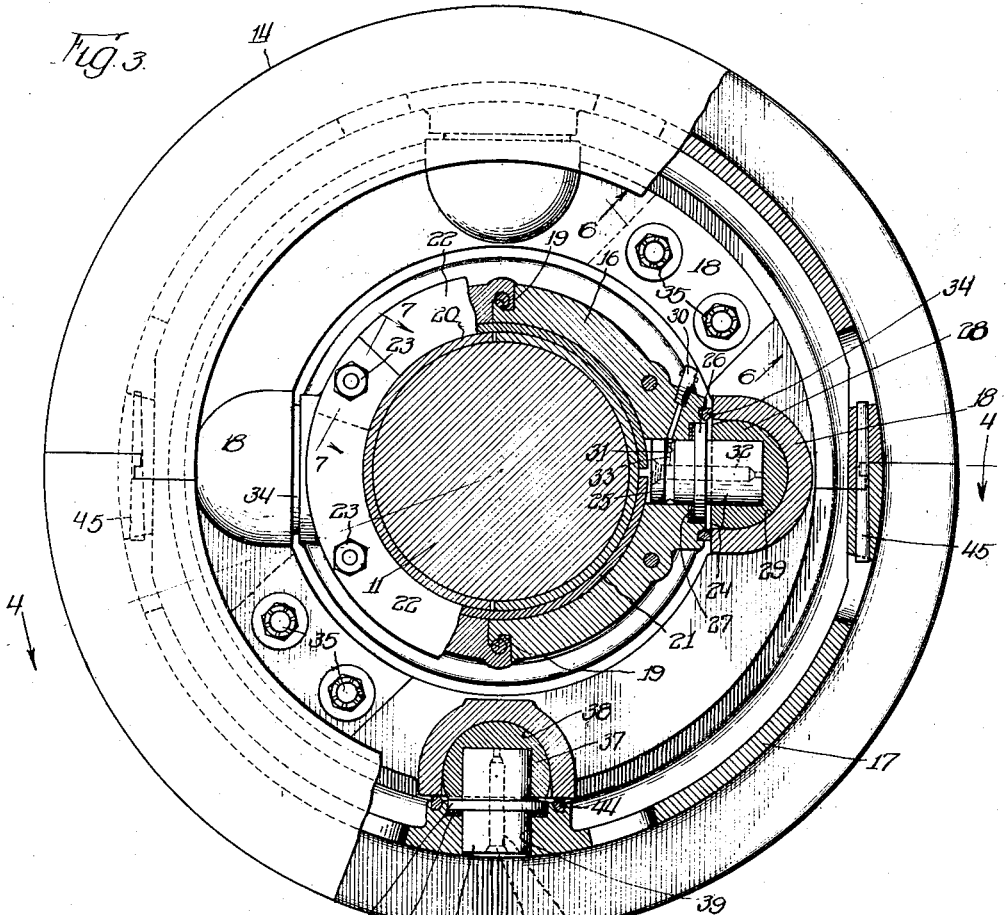
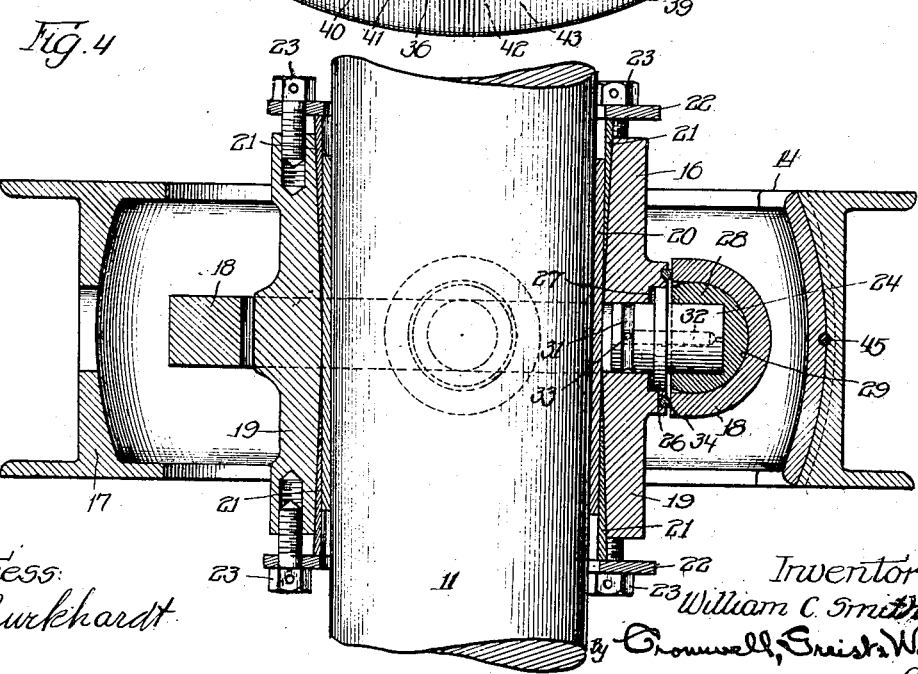
Witness:
R Burkhardt
Inventor:
William C. Smith
By Cromwell, Greist & Warden
Attys.

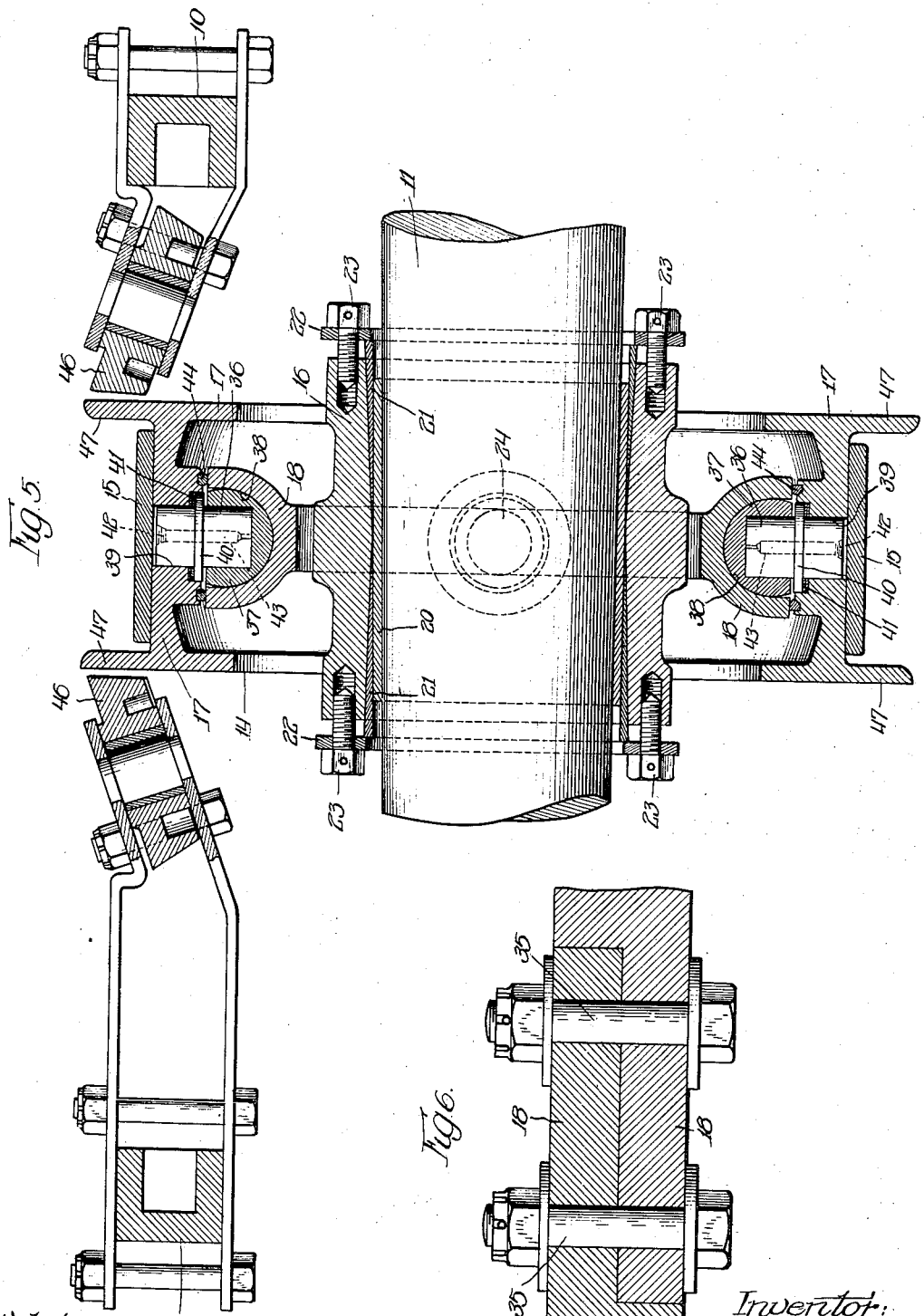

Patented May 8, 1923.

1,454,657

UNITED STATES PATENT OFFICE.

WILLIAM C. SMITH, OF CHICAGO, ILLINOIS, ASSIGNOR TO PULLMAN COMPANY, OF CHICAGO, ILLINOIS, A CORPORATION OF ILLINOIS.

SELF-ALIGNING PULLEY.

Application filed March 1, 1921. Serial No. 448,881.

*To all whom it may concern:*

Be it known that I, WILLIAM C. SMITH, a citizen of the United States, residing at Chicago, in the county of Cook and State of Illinois, have invented certain new and useful Improvements in a Self-Aligning Pulley, of which the following is a specification.

The present invention relates in general to pulleys, and is concerned specifically with a pulley which is capable of automatic self-alignment with a belt or other power transmitting medium operatively associated therewith.

While the pulley of this invention is obviously susceptible of application in many various types of power transmitting assemblies, the particular embodiment here employed to set forth the purposes and operation of the invention is one in which the pulley is mounted on a railway car axle and serves to transmit power therefrom, by means of the customary belt drive, to a generator carried by the car underframe. The present pulley supplants the rigid flanged pulley heretofore employed in this connection, and functions to compensate for lateral angular deflections of the belt about the pulley anchorage in the plane of the car axle. Such deflections occur whenever the railway car, in rounding track curves, necessarily assumes an angle of greater or less degree relative to the wheel trucks on which the same is pivotally mounted. Inasmuch as the generator is fixedly suspended from the car underframe in so far as lateral motion is concerned, the belt which connects the pulley of the same with the rigid pulley on the car axle is obviously subjected, whenever the pulleys are carried out of relative alignment, to greatly unbalanced stresses and consequent wear, resulting in belts becoming distorted, climbing over pulley flanges and frequent losses.

The solution of the above outlined and other analogous difficulties is successfully attained in the development of the pulley hereinafter described.

The main and primary object therefore of the present invention is the provision of a pulley which is capable of automatic self-alignment with its associated belt.

The invention also has in contemplation the provision of a pulley of the nature described which is characterized among other features with self-aligning trunnion bearings, efficient means for securing the pulley to the axle, novel assembling construction, and means becoming operative when the pulley assumes other than a normal position for preventing tilting of the same out of the vertical plane established by the belt and opposed pulley.

Other objects and advantages of the invention will be appreciated as the nature of the same is thoroughly comprehended from the following detailed description predicated on the accompanying drawings.

The particular embodiment hereinafter set forth is chosen primarily for purposes of exemplification, and therefore should not be construed as restricting the spirit of the invention or as limiting unnecessarily the scope of the claims.

In the drawings—

Fig. 1 is a plan view of a portion of a railway car truck, illustrating the pulley of the invention as attached to a car axle and connected by a belt with a pulley of a current generator carried by the car underframe;

Fig. 2 is a side elevation of the same, the pulley guide rollers being omitted for clearness;

Fig. 3 is a side elevation of the pulley mounted on the wheel axle, the axle and portions of the pulley being shown in section;

Fig. 4 is an irregular section, taken on the line 4—4 of Fig. 3;

Fig. 5 is a vertical section of the pulley and guide rollers, taken on a plane substantially at right angles to that of Fig. 4;

Fig. 6 is an enlarged sectional detail view, taken on the line 6—6 of Fig. 3; and Fig. 7 is a similar view, taken on line 7—7 of Fig. 3 to illustrate the manner in which the ends of the complementary ring members are joined.

With reference to the drawings, and particularly to Figs. 1 and 2 thereof, the numeral 10 designates a railway car truck of the ordinary type, 11 and 12 indicate an axle and a wheel respectively thereof, and 13 designates the pulley of an electric current generator which is suspended from the underframe of a railway car. The car body, which is pivotally supported at one of its ends on the above mentioned truck, and the generator are not shown in the drawings.

The pulley of this invention, which is attached to the axle 11 near one end thereof, is indicated by the numeral 14, and upon rotation of the axle drives the generator pulley 13 through the medium of a belt 15 connecting the two.

In Fig. 1 the dotted positions of the pulleys 13 and 14 and of the belt 15 illustrate the way in which the generator pulley and the belt are shifted in a substantially arcuate path relative to the truck when the car is rounding a curve, and the way in which the pulley 14 compensates for such shifting by automatically aligning itself with the belt. The mechanism employed for maintaining the tension of the belt 15 constant is of the ordinary type, and is therefore neither shown nor described in this specification.

Having detailed reference now to Figs. 3, 4 and 5 of the drawings, it will be seen that the pulley 14 is composed of three main parts which are an axle-collar 16, a radially flanged belt-engaging band 17, and an intermediate ring member 18.

The collar 16 is composed of two complementary halves, the contiguous edges of which are provided with inter-locking tongue-and-groove constructions as indicated at 19 in Fig. 3, whereby tangential separation of the halves is prevented while separation axially, by relative movement thereof, is permitted. In positioning the collar 16 on the tapered portion of an axle adjacent its end, a wide strip of brake lining 20 or like compressible fabric is first fitted about the axle at the desired point. The halves of the collar 16 are then coupled together in their interlocked relation about the fabric 20.

In order to provide means for rigidly securing the collar 16 to the axle over the fabric the bore of the collar is so formed that it increases in diameter from its center towards either end, whereby a deep annular recess results at either end of the collar between the same and the fabric. Annular wedges 21 are forced into these recesses and thereby effectively lock the collar to the axle. The wedges 21 are each preferably composed of two complementary members in order to permit removal from the axle. The taper of the axle may be compensated for either by forming the bore of the collar with a more abrupt increase of diameter at one end than at the other, as shown in Figs. 4 and 5, or by the employment of wedges 21 which are of varying taper.

Rings 22 encircle the axle on each side of the collar 16, and serve to force the wedges 21 into position beneath the collar. These rings engage with the exposed blunt ends of the wedges and are drawn axially toward the collar by means of machine screws 23 which pass through apertures in the rings and enter threaded recesses of the collar. In order to permit removal of the rings from the axle, each ring is formed of two complementary semi-circular portions, as shown in Fig. 7. The ends of these portions are tapered, overlapped, and apertured to receive certain of the machine screws 23.

The previously mentioned intermediate ring member 18 is pivotally mounted, at two diametrically opposed points thereof, upon radially disposed trunnion pins 24 journalled in recesses 25 of the collar 16. These trunnion pins fit snugly within the recesses 25 and are prevented from moving inwardly by shoulders 26 on the pins which seat in grooves adjacent the outer ends of the recesses. Shims 27 may be inserted between the base of the shoulders 26 and the bottoms of the grooves in order to take up all axial play of the trunnion pins between the collar 16 and the ring member 18. The portions of the pins 24 which project outwardly from the shoulders 26 are journalled snugly in ball-shaped bearings 28 which in turn are seated in closely fitting sockets 29 formed in the ring member 18 and opening radially inwards relative thereto. The bottoms of these sockets are round and of about the same diameter as the bearings 28 seated therein, whereby universal movement is permitted, and perfect self-alignment at all times of the bearings 28 with their trunnion pins 24 attained.

The surfaces of the pins 24 are lubricated through oiling devices 30 of the ordinary type which are positioned in the collar 16 adjacent the recesses 25 and connect therewith by ducts. These ducts open into annular oil grooves 31 cut in the periphery of the pins 24, whereby the inner ends of the pins are oiled. The outer ends of the pins are oiled by means of axial ducts 32 which are plugged at their inner ends and supplied with oil from the grooves 31 by means of short radial connecting ducts 33. Small rings 34 of resilient material such as cork or fiber are held in compressed form between the collar 16 and ring member 18 in grooves about the trunnion pins, and serve to keep dust out and the oil in.

The ring member 18 is built up of two semi-circular halves which are rabbetted together at their ends and secured rigidly in this position by bolts 35 passing therethrough. This construction is illustrated in Fig. 6.

The radially flanged belt-engaging band 17 is pivotally mounted, at two diametrically opposed points thereof, upon radially disposed trunnion pins 36 journalled in ball-shaped bearing members 37 which are carried in sockets 38 formed in the intermediate ring member 18. The trunnion pins 36 on which the band 17 is mounted are angularly spaced around the ring member 90° from the trunnion pins 24, whereby a limited universal movement of the band 17 relative to the collar 16 and axle 11 is permitted. The outer ends of the trunnion pins 36 are snugly journalled in apertures 39 formed in inwardly flanged portions of the band 17. Shoulders 40 are provided on the pins and seat in grooves around the inner ends of the apertures. Shims 41 may be inserted between the shoulders and the bottoms of the grooves in order to take up all axial play of the pins in their bearings. The bearings of each pin are lubricated by removing a plug 42 in the outer end of the pin and filling an oil reservoir 43 therebelow with oil. This reservoir extends the length of the pin, and the oil escaping from the inner end thereof is distributed about the pin bearings. Cork or fiber rings 44 are compressed between the band 17 and ring member 18 in grooves around the trunnion pins 36, and function to prevent leakage of the oil and entrance of dust.

The band 17 is constructed in two semicircular portions which are provided at their ends with transverse interlocking tongue-and-groove connections. Since it is evident that in the assembling of the pulley belt-engaging band 17 each of the two portions thereof must first be journalled on the trunnion pins 36 when at an angle to the normal plane of the pulley and then moved into relative interlocking alignment, the above mentioned tongue-and-groove connections are arcuately arranged about the inward extension of the trunnion pin axes 36 as a center. This arcuate arrangement is clearly illustrated in Fig. 4. The thickness of the band 17 is increased inwardly at these points, and tapered pins 45 are driven through corresponding apertures cut through the tongue-and-groove connections at right angles thereto and in parallelism with tangents to the band at these points. The smaller ends of these pins are then upset to prevent accidental withdrawal of the same from their apertures.

Bevelled guide rollers 46 are rotatably mounted above the car axle at opposite sides of the pulley 14. These rollers turn freely on axes positioned in the vertical plane containing the axle but at an angle to the normal plane of the pulley, and are supported between plates carried by the frame of the truck 10. The outer bevelled surfaces of the rollers are substantially parallel to but slightly spaced from the flanged sides 47 of the belt-engaging band 17 of the pulley. As long as the pulley maintains its normal position at right angles to its axle 11 the rollers remain out of operation and serve no function. Where the pulley however shifts its plane to compensate for the deflection of the belt 15 one of the rollers will then function as a guide, acting upon the flanges 47 to counteract any tendency of the pulley to tilt out of a vertical plane due to the torque set up by the unequal top and bottom forces acting on the pulley through the belt 15.

From the foregoing it will be appreciated that the invention provides a pulley which is capable of automatic self-alignment with its associated belt. The result is attained by the tendency of the belt fibre forces to produce equilibrium about the universal mounting and the tendency of the belt to continue in one plane when shifted arcuately at its other opposed mounting.

The pulley mechanism, in aligning the belt-engaging band 17 with the belt, operates as follows: In order to effect such alignment the band 17 must move into the same vertical plane occupied by the belt. When the pulley is momentarily in the position shown in Fig. 3 this is accomplished by the pivoting of the band 17 on its then vertically disposed trunnion pins 36, and when the pulley rotates 90° more, the same result is accomplished by the pivoting, instead, of the intermediate ring member 18 on its then vertically disposed trunnion pins 24. When momentarily disposed intermediate either of the positions described it will be readily understood that cooperative pivoting movements at both pairs of trunnion pins will be required in order to effect alignment of the band 17, it being apparent from the nature of the pulley that in order to obtain alignment of the band the trunnion pins 36 thereof must first be brought into the newly assumed vertical plane of the belt.

The term "pulley" as used throughout the preceding specification and following claims is intended to cover broadly a wheel, band pulley, sprocket or gear wheel, and any similar rotating medium for transmitting power tangentially therefrom.

I claim:

1. Power transmission mechanism comprising, in combination with an axle, a flexible pulley structure including an outer ring member adapted to transmit power tangentially thereof, an intermediate ring member, aligned radial trunnion pins the inner ends of which are seated in recesses carried by the axle and the outer ends of which are journalled in bearings carried by the intermediate member whereby to pivot said member on a diameter thereof, and other aligned radial trunnion pins the inner ends of which are journalled in bearings carried by the intermediate member and the outer ends of which are seated in recesses formed in the outer member whereby to pivot the last mentioned member on a diameter thereof at right angles to the pivoting diameter of the intermediate member, one of the bearings of each pin being capable of self-alignment into a position normal to its member.

2. Power transmision mechanism comprising, in combination with an axle, a flexible pulley structure including an outer ring member adapted to transmit power tangentially thereof, an intermediate ring member, aligned radial trunnion pins the inner ends of which are seated in recesses carried by the axle and the outer ends of which are journalled in bearings carried by the intermediate member whereby to pivot said member on a diameter thereof, and other aligned radial trunnion pins the inner ends of which are journalled in bearings carried by the intermediate member and the outer ends of which are seated in recesses formed in the outer member whereby to pivot the last mentioned member on a diameter thereof at right angles to the pivoting diameter of the intermediate member, one of the bearings of each pin being ball shaped and journalled in turn in a ball socket whereby to permit self-alignment of the same into a position normal to its member.

In testimony whereof I have hereunto signed my name in the presence of two subscribing witnesses.

WILLIAM C. SMITH.

Witnesses:
 WILLIAM M. MARTINSON,
 R. E. MEDLAND.